United States Patent
Wu et al.

(10) Patent No.: US 11,078,382 B2
(45) Date of Patent: *Aug. 3, 2021

(54) TWO-COMPONENT SOLVENTLESS ADHESIVE COMPOSITIONS COMPRISING AN AMINE-INITIATED POLYOL

(71) Applicant: Dow Global Technologies LLC, Midland, MI (US)

(72) Inventors: Jie Wu, Freeport, TX (US); Rui Xie, Freeport, TX (US); Kalyan Sehanobish, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/300,560

(22) PCT Filed: Apr. 25, 2017

(86) PCT No.: PCT/US2017/029296
§ 371 (c)(1),
(2) Date: Nov. 10, 2018

(87) PCT Pub. No.: WO2017/196531
PCT Pub. Date: Nov. 16, 2017

(65) Prior Publication Data
US 2019/0177575 A1    Jun. 13, 2019

Related U.S. Application Data

(60) Provisional application No. 62/333,878, filed on May 10, 2016.

(51) Int. Cl.
| B32B 27/40 | (2006.01) |
| C09J 5/04 | (2006.01) |
| C09J 175/12 | (2006.01) |
| C08G 18/38 | (2006.01) |
| B32B 7/12 | (2006.01) |
| C08G 18/50 | (2006.01) |
| C08G 18/76 | (2006.01) |
| B32B 15/14 | (2006.01) |
| B32B 21/08 | (2006.01) |
| B32B 27/12 | (2006.01) |
| C09J 175/00 | (2006.01) |
| B32B 15/04 | (2006.01) |
| B32B 29/00 | (2006.01) |
| B32B 15/12 | (2006.01) |
| B32B 29/02 | (2006.01) |
| B32B 21/10 | (2006.01) |
| B32B 21/04 | (2006.01) |

(Continued)

(52) U.S. Cl.
CPC .................. *C09J 5/04* (2013.01); *B32B 5/022* (2013.01); *B32B 5/024* (2013.01); *B32B 5/26* (2013.01); *B32B 7/12* (2013.01); *B32B 15/043* (2013.01); *B32B 15/08* (2013.01); *B32B 15/10* (2013.01); *B32B 15/12* (2013.01); *B32B 15/14* (2013.01); *B32B 21/042* (2013.01); *B32B 21/06* (2013.01); *B32B 21/08* (2013.01); *B32B 21/10* (2013.01); *B32B 27/08* (2013.01); *B32B 27/10* (2013.01); *B32B 27/12* (2013.01); *B32B 27/32* (2013.01); *B32B 29/005* (2013.01); *B32B 29/02* (2013.01); *C08G 18/5021* (2013.01); *C08G 18/76* (2013.01); *C09J 175/00* (2013.01); *C09J 175/04* (2013.01); *B32B 2255/10* (2013.01); *B32B 2255/205* (2013.01); *B32B 2307/306* (2013.01); *B32B 2307/714* (2013.01); *B32B 2439/70* (2013.01); *B32B 2597/00* (2013.01); *C08G 18/4277* (2013.01); *C08G 18/44* (2013.01)

(58) Field of Classification Search
None
See application file for complete search history.

(56) References Cited

U.S. PATENT DOCUMENTS

| 3,886,122 A | 5/1975 | Fabris et al. |
| 4,171,419 A | 10/1979 | Meyer et al. |

(Continued)

FOREIGN PATENT DOCUMENTS

WO    WO-0071343 A1 * 11/2000 ......... B32B 37/1207

OTHER PUBLICATIONS

PCT/US2017/029296, International Search Report and Written Opinion dated Jul. 17, 2017.

(Continued)

*Primary Examiner* — Michael J Feely
(74) *Attorney, Agent, or Firm* — William R. Hales

(57) ABSTRACT

A two-component solventless adhesive composition is disclosed, the adhesive composition comprising an isocyanate component comprising at least one isocyanate, and a polyol component comprising at least one amine-initiated polyol having a functionality of from 3 to 8 and a hydroxyl number of from 20 to 1,000, wherein the first and second components are formulated to be applied to separate substrates before being brought together. Further, a method for forming a laminate is disclosed, the method comprising uniformly applying the isocyanate component to a first substrate, uniformly applying the polyol component to a second substrate, bringing the first and second substrates together, thereby mixing and reacting the isocyanate component and the polyol component to form an adhesive between the first and second substrates, and curing the adhesive to bond the first and second substrates. Still further, a laminate formed by the method is disclosed.

17 Claims, 2 Drawing Sheets

(51) Int. Cl.

| | | |
|---|---|---|
| *B32B 15/10* | (2006.01) | |
| *B32B 15/08* | (2006.01) | |
| *B32B 27/10* | (2006.01) | |
| *B32B 5/02* | (2006.01) | |
| *B32B 27/08* | (2006.01) | |
| *B32B 27/32* | (2006.01) | |
| *B32B 21/06* | (2006.01) | |
| *B32B 5/26* | (2006.01) | |
| *C09J 175/04* | (2006.01) | |
| *C08G 18/42* | (2006.01) | |
| *C08G 18/44* | (2006.01) | |

(56) References Cited

U.S. PATENT DOCUMENTS

| | | |
|---|---|---|
| 4,342,613 A | 8/1982 | O'Leary et al. |
| 4,923,756 A | 5/1990 | Chung et al. |
| 5,134,216 A | 7/1992 | Jansen et al. |
| 5,164,473 A | 11/1992 | Dormish et al. |
| 5,562,148 A | 10/1996 | Schneider |
| 5,614,575 A * | 3/1997 | Kotschwar ............ C08G 18/482 524/270 |
| 5,672,229 A | 9/1997 | Konig et al. |
| 5,981,683 A | 11/1999 | Gillis et al. |
| 2004/0138402 A1 | 7/2004 | Thiele et al. |
| 2010/0297427 A1 | 11/2010 | Schlingloff et al. |
| 2012/0295104 A1 | 11/2012 | Barker |
| 2015/0096503 A1 | 4/2015 | Dugan et al. |
| 2016/0090515 A1 | 3/2016 | Roock et al. |
| 2016/0298009 A1 | 10/2016 | Dey et al. |
| 2018/0044462 A1 | 2/2018 | Blodau et al. |
| 2019/0202172 A1 * | 7/2019 | Schmidt .................. B32B 5/022 |
| 2019/0284456 A1 * | 9/2019 | Wu ........................ C08G 18/71 |
| 2019/0390094 A1 * | 12/2019 | Wu ........................ C08G 18/10 |
| 2019/0390095 A1 * | 12/2019 | Vinci .................. C08G 18/3278 |

OTHER PUBLICATIONS

PCT/US2017/029296, International Preliminary Report on Patentability dated Nov. 13, 2018.

* cited by examiner

TWO-COMPONENT SOLVENTLESS ADHESIVE COMPOSITIONS COMPRISING AN AMINE-INITIATED POLYOL

REFERENCE TO RELATED APPLICATIONS

The present application claims the benefit of U.S. Provisional Application No. 62/333,878, filed on May 10, 2016.

FIELD OF THE DISCLOSURE

The instant disclosure relates to solventless adhesive compositions. More particularly, the disclosure relates to two-component solventless polyurethane adhesive compositions formulated for use with fabrication of laminates, the compositions having improved conversion efficiency, bond strength, chemical and thermal resistance, and primary aromatic amine and isocyanate decay.

The disclosure further relates to methods of forming laminate structures comprising the disclosed adhesive compositions. In some embodiments, the adhesive compositions exhibit high reactivity and, thus, are formulated to be applied to two substrates independently which are then brought together to mix and react the adhesive composition. In particular, one component of the adhesive composition is configured to be uniformly applied to a surface of a first substrate and the other component of the adhesive composition is configured to be applied to a surface of a second substrate. The first and second substrates are subsequently brought together, thereby mixing and reacting the two components to form an adhesive between the first and second substrates. In this way, the adhesive can then be cured, thereby bonding the first and second substrates.

BACKGROUND OF THE DISCLOSURE

Adhesive compositions are useful for a wide variety of purposes. For instance, adhesive compositions are used to bond together substrates such as polyethylene, polypropylene, polyester, polyamide, metal, paper, or cellophane to form composite films, i.e., laminates. The use of adhesives in different end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive can vary by category and by the application in which the adhesive is applied.

Solventless laminating adhesives can be applied up to 100% solids without either organic solvents or an aqueous carrier. Because no organic solvent or water has to be dried from the adhesive upon application, these adhesives can be run at high line speeds. Solvent and water-based laminating adhesives are limited by the rate at which the solvent or water can be effectively dried and removed from the laminate structure after application of the adhesive. For environmental, health, and safety reasons, laminating adhesives are preferably aqueous or solventless.

Within the category of solventless laminating adhesives, there are many varieties. One particular variety includes two-component polyurethane-based laminating adhesives premixed prior to application, referred to herein as "premixed two-component adhesives." Typically, a two-component polyurethane-based laminating adhesive includes a first component comprising an isocyanate-containing prepolymer and/or a polyisocyanate and a second component comprising a polyol. The prepolymer is obtained by the reaction of excess isocyanate with a polyether and/or polyester containing two or more hydroxyl groups per molecule. The second component is a polyether and/or polyester functionalized with two or more hydroxyl groups per molecule. The two components are combined in a predetermined ratio, or "premixed," and then applied on a substrate, which is then laminated to another substrate.

Additional layers of substrate can be added to the structure with additional layers of adhesive composition located between each successive substrate. The adhesive is then cured, either at room temperature or elevated temperature, thereby bonding the substrates together.

Further processing of the laminate structure depends upon the curing speed of the adhesive. The curing speed of the adhesive is indicated by the time in which the mechanical bond between the laminated substrates takes to become sufficient to allow for further processing and the laminate is in compliance with applicable regulations (e.g., food contact regulations). Slow curing speed results in lower conversion efficiency. Premixed two-component solventless laminating adhesives, compared to traditional solvent-containing adhesives, exhibit weak initial bonds and slow curing speed. The general trend in the converting industry is towards faster curing laminating adhesives. Faster curing improves the operational efficiency for converters. Specifically, quickly moving finished products out of a warehouse increases production capacity and flexibility for handling last minute orders (e.g., retailer promotional campaigns). In order to increase operational efficiency, an adhesive composition with a reactivity much higher than existing adhesive compositions should be used to form laminates. However, such an adhesive composition would provide a challenge for current adhesive application technologies.

Two-component solventless polyurethane-based laminating adhesives, compared to traditional solvent-containing adhesives, include weak initial bonds and slow bond development before the laminate can be processed. In addition, these adhesives tend to exhibit poor chemical resistance, especially in acidic conditions. Still more, conventional two-component solventless polyurethane-based laminating adhesives exhibit slow primary aromatic amine and isocyanate decay and, therefore, lower conversion efficiency. Further, catalysts are widely used in polyurethane chemistry to speed up the reaction of isocyanates and hydroxyl terminated compounds. Typical catalysts include amine catalysts, metal catalysts, blocked amine and metal catalysts, and microencapsulated amine and metal catalysts. These catalysts can be very effective, but they are not ideally suited for food contact applications. This is because small molecule amine and metal catalysts can potentially migrate into food, which can be a concern from a food safety standpoint. In addition, small amine catalysts often possess strong odor that can alter the taste of food, making them not desirable for direct or indirect food contact applications.

Accordingly, two-component solventless polyurethane-based laminating adhesive compositions with improved bond strength and faster developing bonds, improved chemical and thermal resistance, and faster primary aromatic amine and isocyanate decay, are desirable. Still further, two-component solventless polyurethane-based laminating adhesive compositions not requiring the use of a catalyst to speed up the isocyanate and polyol reaction are desirable.

SUMMARY OF THE DISCLOSURE

Two-component solventless polyurethane adhesive compositions are disclosed. In some embodiments, the solventless adhesive composition comprises an isocyanate component comprising at least one isocyanate. The solventless adhesive composition further comprises a polyol component comprising at least one amine-initiated polyol. The at least one isocyanate can be selected from the group consisting of an aromatic isocyanate, an aliphatic isocyanate, a cycloaliphatic isocyanate, and combinations thereof. The at least one amine-initiated polyol can be the reaction product of an alkylene oxide and an amine. The amine-initiated polyol can further comprise a functionality of from 3 to 8 and a hydroxyl number of from 20 to 1,000. The polyol component can further comprise a non-amine-initiated polyol.

In some embodiments, the method includes uniformly applying an isocyanate component to a first substrate. The isocyanate component includes at least one polyisocyanate. The method further includes uniformly applying a polyol component to a second substrate. The first and second substrates are then brought together, thereby mixing and reacting the isocyanate component and the polyol component to form an adhesive between the first and second substrates. The mixed adhesive composition is then cured, thereby bonding the first and second substrates. Because of the constituents of the adhesive composition, the adhesive composition is capable of achieving a viscosity greater than 10,000 mPa-s within 10 minutes after bringing the first and second substrates together.

Laminated structures made according to the disclosed methods can be slit within as little as two hours after lamination and delivered within two days to a customer. Laminates made using existing general purpose adhesive compositions typically require two to three days from lamination for slitting and five to seven days for delivery. Accordingly, the process efficiencies are greatly improved according to the disclosed methods. In addition, the pot-life of the adhesive compositions used in the disclosed methods is indefinite compared to a twenty to thirty minute pot-life for existing general purpose adhesives. This is because the pot-life of the disclosed adhesive compositions is completely decoupled from the curing process, as will be discussed below.

Because the adhesive compositions used in the disclosed methods are formulated to be more highly reactive than existing adhesive compositions, they are not ideally suited for use with existing adhesive application apparatuses. This is because the two components react very quickly, causing the adhesive to gel and be unfit for application to a substrate. For this reason, the adhesive compositions used in the disclosed methods are formulated such that the isocyanate and polyol components are applied separately on two different substrates, instead of being premixed and applied on a carrier web.

In particular, the adhesive compositions used in the disclosed methods are formulated such the isocyanate component can be uniformly applied to a surface of a first substrate and the polyol component can be uniformly applied to a surface of a second substrate. The surface of the first substrate is then brought into contact with the surface of the second substrate to mix and react the two components, thereby forming a laminate. The adhesive composition is then cured.

BRIEF DESCRIPTION OF THE DRAWINGS

Reference is made to the accompanying drawings in which.

DETAILED DESCRIPTION OF THE DISCLOSURE

Figure 1:
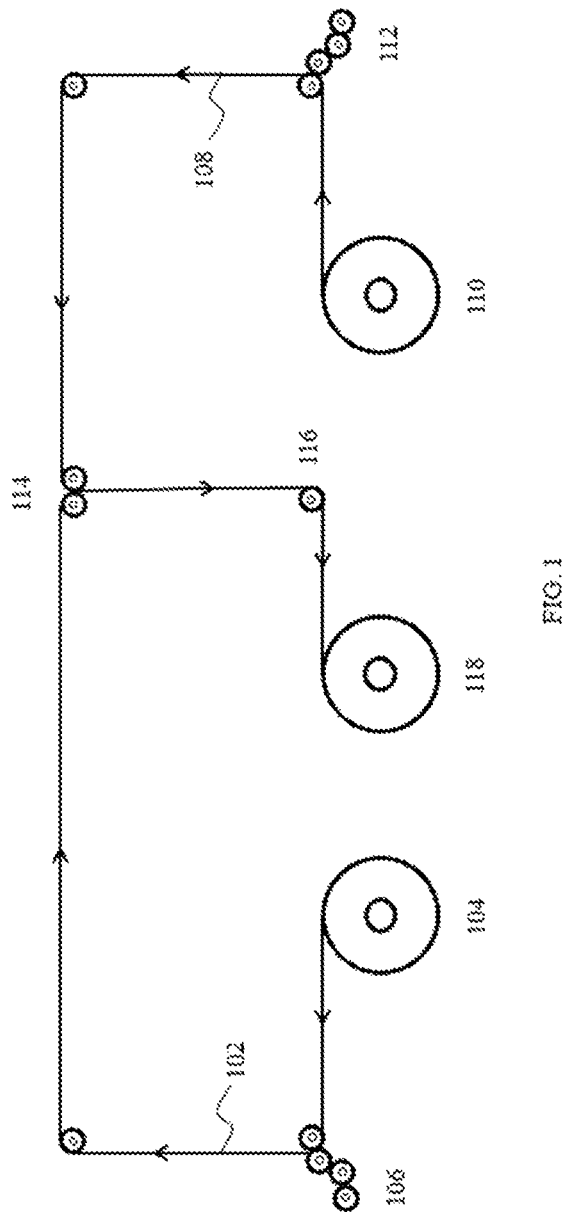
FIG. 1 is a schematic view of an apparatus for forming a laminate according to the disclosed methods.

The two-component solventless adhesive composition according to this disclosure comprises an isocyanate component and a polyol component.

Isocyanate Component

The isocyanate component comprises at least one isocyanate. The at least one isocyanate can be selected from the group consisting of an isocyanate prepolymer, an isocyanate monomer, a polyisocyanate (e.g., dimers, trimmers, etc.), and combinations of two or more thereof. As used herein, a "polyisocyanate" is any compound that contains two or more isocyanate groups. The isocyanate prepolymer is the reaction product of reactants comprising at least one isocyanate and at least one polyol. As used herein, the "isocyanate prepolymer" can be a polyisocyanate itself.

The at least one isocyanate can be selected from the group consisting of an aromatic isocyanate, an aliphatic isocyanate, a cycloaliphatic isocyanate, and combinations of two or more thereof. An "aromatic polyisocyanate" is a polyisocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Examples of aromatic isocyanates suitable for use according to the disclosure include, but are not limited to, isomers of methylene diphenyl diisocyanate ("MDI"), such as 4,4-MDI, 2,2-MDI and 2,4-MDI, isomers of toluene-diisocyanate ("TDI") such as 2,4-TDI, 2,6-TDI, isomers of naphthalene-diisocyanate ("NDI") such as 1,5-NDI, isomers of norbornane diisocyanate ("NBDI"), isomers of tetramethylxylylene diisocyanate ("TMXDI"), and combinations of two or more thereof. Preferred are isomers of MDI, particularly a mixture of 4,4-MDI and 2,4-MDI (i.e., liquid MDI) or 4,4-MDI (i.e., solid MDI).

Examples of aliphatic and cycloaliphatic isocyanates suitable for use according to the disclosure include, but are not limited to, isomers of hexamethylene diisocyanate ("HDI"), isomers of isophorone diisocyanate ("IPDI"), isomers of xylene diisocyanate ("XDI"), and combinations thereof.

Compounds having isocyanate groups, such as the isocyanate component, may be characterized by the parameter "% NCO," which is the amount of isocyanate groups by weight based on the weight of the compound. The parameter % NCO is measured by the method of ASTM D 2572-97 (2010). The disclosed isocyanate component has a % NCO of at least 1 wt %, or at least 5 wt %, or at least 10 wt %. Preferably the isocyanate component has a % NCO not to exceed 30 wt %, or 25 wt %, or 20 wt %.

Preferably the isocyanate component has viscosity at 25° C. of 300 mPa-s to 12,000 mPa-s, as measured by the method of ASTM D2196.

Polyol Component

The solventless adhesive composition further comprises a polyol component comprising at least one amine-initiated polyol. In some embodiments, the polyol component can also comprise another type of polyol which is a non-amine-initiated polyol. Each polyol type may include one kind of polyol. Alternatively, each polyol type may include mixtures of different kinds of polyols. In some embodiments, one polyol type may be one kind of polyol whereas the other polyol type may be a mixture of different kinds of polyols.

The at least one amine-initiated polyol improves the reactivity of the adhesive composition system. In particular, the at least one amine-initiated polyol is a hydroxyl terminated molecule and, as a result, becomes part of the polyurethane polymer network formed by the reaction of the isocyanate and polyol components. As a result, the concern of migration of small molecules (e.g., a catalyst) is eliminated.

The at least one amine-initiated polyol comprises a functionality of from 3 to 8, or from 4 to 7, or from 5 to 6. As used herein, "functionality" refers to the number of isocyanate reactive sites per molecule. Further, the at least one amine-initiated polyol comprises a hydroxyl number of from 20 to 1,000, or from 200 to 900, or from 750 to 850. As used herein, "hydroxyl number" is a measure of the amount of reactive hydroxyl groups available for reaction. This number is determined in a wet analytical method and is reported as the number of milligrams of potassium hydroxide equivalent to the hydroxyl groups found in one gram of the sample. The most commonly used methods to determine hydroxyl number are described in ASTM D 4274 D. Still further, the at least one amine-initiated polyol comprises a molecular weight not to exceed 12,000 g/mol, or not to exceed 8,000 g/mol, or not to exceed 5,000 g/mol.

Amine-initiated polyols suitable for use according to this disclosure are made by alkoxylating one or more amine initiators with one or more alkylene oxides. Suitable amine initiators include, but are not limited to, toluene diamine, methylamine, ethylenediamine, diethylenetriamine, aniline, aminoethylethanolamine, bis-3-aminopropylmethylamine, propylenediamine, tetra- or hexamethyleneamine, triethanolamine, phenylenediamine, and combinations of two or more thereof. Suitable alkylene oxides include, but are not limited to, $C_1$-$C_6$ alkylene oxides, such as ethylene oxide, propylene oxide, 1,2-butylene oxide, and combinations of two or more thereof.

The amount of the at least one amine-initiated polyol in the adhesive composition is, by weight based on the weight of the adhesive composition (i.e., the total weight of the isocyanate component and the polyol component), at least 0.5 wt %, or at least 0.7 wt %, or at least 6 wt %. The amount of the at least one amine-initiated polyol in the adhesive composition is, by weight based on the weight of the adhesive composition, not to exceed 25 wt %, or not to exceed 15 wt %, or not to exceed 10 wt %.

The amount of the at least one amine-initiated polyol in the adhesive composition depends on the reactivity of the at least one isocyanate used. In general, relatively less amine-initiated polyol is required for aromatic isocyanate-based adhesives compared to aliphatic isocyanate-based systems.

It is contemplated that the isocyanate component and the polyol component of the disclosed solventless adhesive composition can be made separately and, if desired, stored until it is desired to apply. Preferably, both the isocyanate component and the polyol component are each liquid at 25° C. In some embodiments, when it is desired to use the adhesive composition, the isocyanate component and the polyol component are brought into contact with each other and mixed together. It is contemplated that when these two components are brought into contact, a curing reaction begins in which the isocyanate groups react with the hydroxyl groups to form urethane links. The adhesive composition formed by bringing the two components into contact can be referred to as a "curable mixture."

The time required for the curable mixture to cure is, preferably, as short as necessary to achieve sufficient bond strength. This is because shorter cure times enhance the efficiency of the laminate formation process. Traditionally, aliphatic isocyanates are not preferred because they are less reactive than aromatic isocyanates, resulting in longer cure times. However, the disclosed adhesive compositions achieve relatively short cure times even when the isocyanate component comprises aliphatic isocyanates.

In some embodiments, one or more non-amine-initiated polyols may optionally be included in the adhesive composition. Examples of the non-amine-initiated polyol include, but are not limited to, polyester polyols, polyether polyols, polycarbonate polyols, polyacrylate polyols, polycaprolactone polyols, polyolefin polyols, natural oil polyols, and combinations of two or more thereof. Preferably the non-amine-initiated polyol has viscosity at 25° C. of 10 mPa-s to 40,000 mPa-s, as measured by the method of ASTM D2196.

The amount of the at least one non-amine-initiated polyol in the adhesive composition is at least 10 wt %, or at least 20 wt %, or at least 30 wt %, based on the weight of the adhesive composition. The amount of the at least one non-amine-initiated polyol in the adhesive composition is not to exceed 60 wt %, or not to exceed 50 wt %, or not to exceed 40 wt %, based on the weight of the adhesive composition.

Preferably, the stoichiometric ratio of the isocyanate component to the polyol component is 1:1 or higher, such as 1.2:1 or higher, or such as 1.4:1 or higher. Preferably, the stoichiometric ratio of the isocyanate component to the polyol component is 3:1 or lower, such as 2.5:1 or lower, or such as 2:1 or lower. In general, the ratio of isocyanate component to polyol component for industrial applications (e.g., pipes) can be relatively higher than the ratio for consumer goods applications (e.g., food packaging) where migration of isocyanate from adhesives to food is a safety concern.

In some embodiments, one or more additives can optionally be included in the adhesive composition. Examples of such additives include, but are not limited to, tackifiers, plasticizers, rheology modifiers, adhesion promoters, antioxidants, fillers, colorants, surfactants, catalysts, solvents, and combinations of two or more thereof.

In some embodiments, one or more catalysts can optionally be included in the adhesive composition.

Laminate Formation

It is contemplated that the isocyanate component and the polyol component of the solventless adhesive compositions used in the disclosed methods are formulated separately and stored until it is desired to form a laminate structure. Preferably, the isocyanate component and polyol component are in a liquid state at 25° C. Even if the components are solid at 25° C., it is acceptable to heat the components as necessary to put them into a liquid state. As the pot-life of the adhesive composition is decoupled from the curing process, the components can be stored indefinitely.

A laminate formed according to the disclosed methods can be formed by applying the isocyanate and polyol components of an adhesive composition separately to two different substrates, such as two films. As used herein, a "film" is any structure that is 0.5 mm or less in one dimension and is 1 cm or more in both of the other two dimensions. A "polymer film" is a film that is made of a polymer or mixture of polymers. The composition of a polymer film is, typically, 80 percent by weight or more by weight one or more polymers.

Turning now to FIG. 1, a schematic view of an apparatus for carrying out the method is shown, for illustrative purposes. The apparatus includes a first substrate 102 which is unwindable from a first unwinder web 104. The first substrate can be a film, as discussed above. The first substrate 102 passes through an application unit 106 in which a layer of an isocyanate component of an adhesive composition is applied to the first substrate 102. The application unit includes dosing rollers typically operated between 30 and 40° C. The application unit further includes an application roller typically operated between 30 and 60° C. The apparatus further includes a second substrate 108 which is unwindable from a second unwinder web 110. The second substrate 108 can also be a film. The second substrate passes 108 through an application unit 112 in which a layer of a polyol component of the adhesive composition is applied to the second substrate 108. Preferably, the thickness of the first and second layers applied to the first and second substrates 102, 108, respectively, are from 0.5 to 2.5 μm each. By controlling the thickness of the layers applied to each substrate, the ratio of the components can be controlled.

The surfaces of the first and second substrates 102, 108 are then run through a device for applying external pressure to the first and second substrates 102, 108, such as nip roller 114. The nip roller is typically operated between 30 and 50° C. and at a pressure between 2 and 4 bar. Bringing the isocyanate component and polyol component together forms a curable adhesive mixture layer. When the surfaces of the first and second substrates 102, 108 are brought together, the thickness of the curable adhesive mixture layer is 1 to 5 μm. The isocyanate component and polyol component begin mixing and reacting when the first and second substrates 102, 108 are brought together and the components come into contact with each other. This marks the beginning of the curing process.

Further mixing and reacting is accomplished as the first and second substrates 102, 108 are run through various other rollers, e.g., roller 116, and ultimately to a rewind roller 118. The further mixing and reacting occurs as the first and second substrates 102, 108 pass through rollers because the substrates each take longer or shorter paths than the other substrate across each roller. In this way, the two substrates move relative to one another, mixing the components on the respective substrates. Arrangements of rollers in an application apparatus are commonly known in the art. The curable mixture is then cured or allowed to cure.

Suitable substrates in the laminate structure include films such as paper, woven and nonwoven fabric, metal foil, polymers, and metal-coated polymers. Films optionally have a surface on which an image is printed with ink; the ink may be in contact with the adhesive composition.

Examples of the Disclosure

The present disclosure will now be explained in further detail by showing Illustrative Examples and Comparative Examples (collectively, "the Examples"). However, the scope of the present disclosure is not, of course, limited to the Examples.

The raw materials for use in the Illustrative Examples ("IE") and Comparative Examples ("CE") are detailed in Table 1 below.

| Material | Commercial Name | Chemical Nature | Commercial Supplier |
|---|---|---|---|
| Component A | MOR-FREE ™ L PLUS 1 | Aromatic polyisocyanate | The Dow Chemical Co. |
| Component B | VORANOL ™ 800 | Amine-initiated polyol | The Dow Chemical Co. |
| Component C | BESTER ™ 648 | Hydroxyl-terminated component | The Dow Chemical Co. |
| Component D | BESTER ™ 270 | Hydroxyl-terminated component | The Dow Chemical Co. |
| Component E | BESTER ™ 105 | Hydroxyl-terminated component | The Dow Chemical Co. |
| Component F | VORANOL ™ CP755 | Hydroxyl-terminated component | The Dow Chemical Co. |
| Component G | MOR-FREE ™ 218 | Hydroxyl-terminated component | The Dow Chemical Co. |

Examples are prepared according to formulations listed in Table 2 using the raw materials listed in Table 1.

TABLE 2

Example adhesive formulations

| | Formulation (wt % basis) | | | |
|---|---|---|---|---|
| Ingredient | CE1 | IE1 | IE2 | IE3 |
| Component A | 39.40 | 52.60 | 53.49 | 50.00 |
| Component B | — | 2.37 | 3.26 | 3.50 |
| Component C | 21.21 | — | — | 14.00 |
| Component D | 24.24 | 5.69 | 6.98 | 20.00 |
| Component E | 12.12 | — | — | 10.00 |
| Component F | — | 34.6 | 33.95 | — |
| Component G | 3.03 | 4.74 | 2.32 | 2.50 |
| TOTAL | 100 | 100 | 100 | 100 |

Example 1 ("IE1")

A polyurethane adhesive composition comprising about 52.6 wt. % Component A, 5.69 wt. % Component D, 34.6 wt. % Component F, 4.74 wt. % Component G, and 2.37 wt. % Component B is prepared. The viscosity buildup of this formulated adhesive is measured by a Brookfield DV-II viscometer at 45° C. This adhesive is used to bond Foil/Polyethylene (PE) structure. The produced laminates are cured at 25° C. and 50% relative humidity. The laminate samples are cut into 15 mm wide strips and their T-peel bond strength is evaluated on Thwing-Albert peel tester at 4 inch/min. If one of the substrates stretches or tears, the maximum force or force at break is recorded. The average of the force during the test is recorded if the two substrates are separated. The bond strength values are the average of at least three sample strips.

Example 2 ("IE2")

A polyurethane adhesive composition comprising about 53.49 wt. % Component A, 6.98 wt. % Component D, 33.95 wt. % Component F, 2.32 wt. % Component G, and 3.26 wt. % Component B is prepared. The viscosity buildup of this formulated adhesive is measured by a Brookfield DY-II viscometer at 45° C. This adhesive is used to bond Foil/Polyethylene (PE) structure. The produced laminates are cured at 25° C. and 50% relative humidity. The laminate samples are cut into 15 mm wide strips and their T-peel bond strength is evaluated on Thwing-Albert peel tester at 4 inch/min. If one of the substrates stretches or tears, the maximum force or force at break is recorded. The average of the force during the test is recorded if the two substrates are separated. The bond strength values are the average of at least three sample strips.

Example 3 ("IE3")

A polyurethane adhesive composition comprising about 50 wt. % Component A, 20 wt. % Component D, 10 wt. % Component E, 14 wt. % Component C, 2.5 wt. % Component G, and 3.5 wt. % Component B is prepared. The viscosity buildup of this formulated adhesive is measured by a Brookfield DY-II viscometer at 45° C. This adhesive is used to bond Foil/Polyethylene (PE) structure. The produced laminates are cured at 25° C. and 50% relative humidity. The laminate samples are cut into 15 mm wide strips and their T-peel bond strength is evaluated on Thwing-Albert peel tester at 4 inch/min. If one of the substrates stretches or tears, the maximum force or force at break is recorded. The average of the force during the test is recorded if the two substrates were separated. The bond strength values are the average of at least three sample strips.

Comparative Example 1 ("CE1")

A polyurethane adhesive composition comprising about 39.4 wt. % Component A, 24.24 wt. % Component D, 12.12 wt. % Component E, 21.21 wt. % Component C, and 3.03 wt. % Component G is prepared. The viscosity buildup of this formulated adhesive is measured by a Brookfield DY-II viscometer at 45° C. This adhesive is used to bond Foil/Polyethylene (PE) structure. The produced laminates are cured at 25° C. and 50% relative humidity. The laminate samples are cut into 15 mm wide strips and their T-peel bond strength is evaluated on Thwing-Albert peel tester at 4 inch/min. If one of the substrates stretches or tears, the maximum force or force at break is recorded. The average of the force during the test is recorded if the two substrates were separated. The bond strength values are the average of at least three sample strips.

TABLE 3

Bond strength data of Foil/PE laminates

| Adhesives | Bond Strength (N/15 mm) | |
| --- | --- | --- |
| | 2 Hour | 6 Hour |
| CE1 | 0.02 ± 0.00 | 0.06 ± 0.00 |
| IE1 | 0.58 ± 0.0.07 | 2.53 ± 0.21 |
| IE2 | 1.22 ± 0.05 | 3.24 ± 0.80 |
| IE3 | 1.34 ± 0.27 | 2.88 ± 0.50 |

Figure 2:
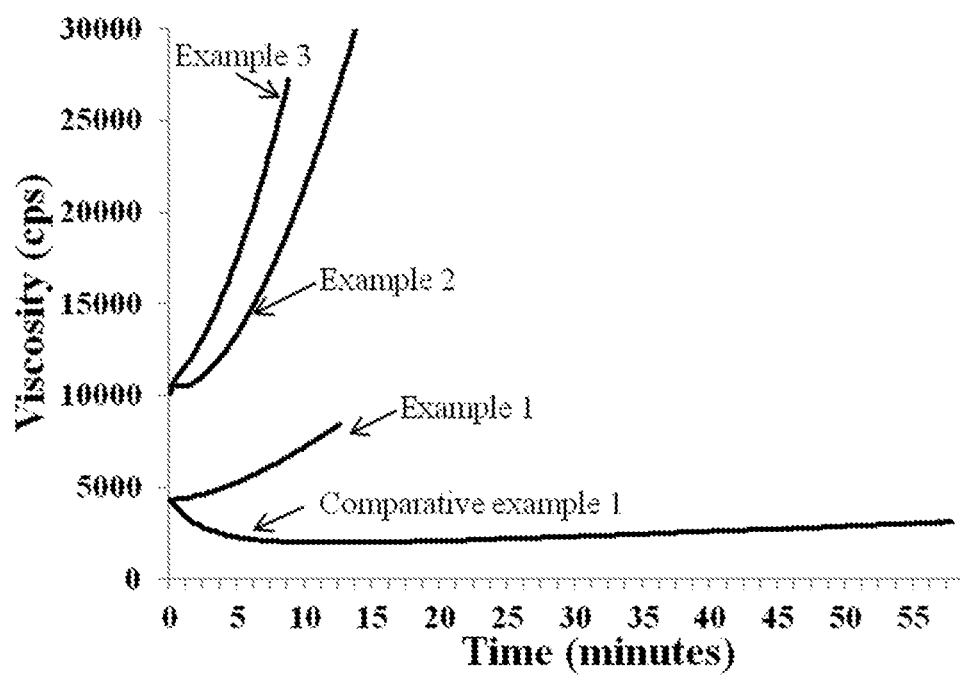
FIG. 2 is a plot illustrating the viscosity of Comparative Example 1 and Illustrative Examples 1 through 3 versus time.

Turning now to FIG. 2, a plot illustrating the viscosity of Comparative Example 1 and Illustrative Examples 1 through 3 versus time is shown, for illustrative purposes. As illustrated in FIG. 2, the curing rate of a polyurethane laminating adhesive is effectively accelerated by incorporating amine-initiated polyols. For example, the viscosity of CE1 reached 3,000 cps by 55 minutes whereas IE3, with an addition of a small amount of amine-initiated polyol achieved 25,000 cps by 8 minutes, showing excellent fast curing property.

Table 3 illustrated that laminates that use adhesives containing amine-initiated polyols in formulation have the ultra-fast bond strength development. For example, IE3, with the addition of a small amount of amine-initiated polyol, has a bond strength of 1.34 N/15 mm after 2 hour curing in comparison to nearly 0 N/15 mm bond strength for CE1.

The invention claimed is:

1. A non-premixed two-component solventless laminating adhesive composition for use in food packaging laminates, comprising:
    an isocyanate component comprising at least one isocyanate, the isocyanate component having film forming properties allowing for a uniform film thickness of 0.5 to 2.5 μm when applied to a first substrate; and
    a polyol component comprising at least one amine-initiated polyol having a functionality of from 3 to 8 and a hydroxyl number of from 20 to 1,000, the polyol component having film forming properties allowing for a uniform film thickness of 0.5 to 2.5 μm when applied to a second substrate;
    wherein the film thicknesses of the components control the stoichiometric ratio of components in the adhesive composition when the films are brought together for mixing and reacting, such that the stoichiometric ratio of the isocyanate component to the polyol component ranges from 1:1 to 3:1.

2. The non-premixed two-component solventless laminating adhesive composition of claim 1, wherein the at least one isocyanate is selected from the group consisting of a monomeric isocyanate, a polymeric isocyanate, an isocyanate prepolymer, and combinations of two or more thereof.

3. The non-premixed two-component solventless laminating adhesive composition of claim 1, wherein the at least one isocyanate is selected from the group consisting of hexamethylene diisocyanate ("HDI") and isomers thereof, isophorone diisocyanate ("IPDI") and isomers thereof, norbornane diisocyanate ("NBDI") and isomers thereof, tetramethylxylylene diisocyanate ("TMXDI") and isomers thereof, xylylene diisocyanate ("XDI") and isomers thereof, toluene diisocyanate ("TDI") and isomers thereof, diphenylmethane diisocyanate ("MDI") and isomers thereof, isocyanate prepolymers thereof, and combinations of two or more thereof.

4. The non pre-mixed two-component solventless laminating adhesive composition of claim 1, wherein the amine-initiated polyol is the reaction product of a $C_1$-$C_6$ alkylene oxide and an amine.

5. The non-premixed two-component solventless laminating adhesive composition of claim 4, wherein the amine is selected from the group consisting of toluene diamine, methylamine, ethylenediamine, diethylenetriamine, aniline, aminoethylethanolamine, bis-3-aminopropylmethylamine, propylenediamine, tetra-hexamethyleneamine, triethanolamine, phenylenediamine, and combinations of two or more thereof.

6. The non-premixed two-component solventless laminating adhesive composition of claim 1, wherein the amine-initiated polyol accounts for 0.5 to 20 wt % of the adhesive composition, based on the total weight of the adhesive composition.

7. The non-premixed two-component solventless laminating adhesive composition of claim 1, the polyol component further comprising at least one non-amine-initiated polyol selected from the group consisting of a polyester polyol, a polyether polyol, a polycarbonate polyol, a polyacrylate polyol, a polycaprolactone polyol, a polyolefin polyol, a natural oil polyol, and combinations of two or more thereof.

8. The non-premixed two-component solventless laminating adhesive composition of claim 1, further comprising an additive selected from the group consisting of a tackifier, a plasticizer, a rheology modifier, an adhesion promoter, an antioxidant, a filler, a colorant, a surfactant, a catalyst, and combinations of two or more thereof.

9. A method for forming a laminate, comprising:
uniformly applying an isocyanate component having film forming properties to a first substrate at a film thickness of 0.5 to 2.5 μm, the isocyanate component comprising at least one isocyanate; and
uniformly applying a polyol component having film forming properties to a second substrate at a film thickness of 0.5 to 2.5 μm, the polyol component comprising at least one amine-initiated polyol having a functionality of from 3 to 8 and a hydroxyl number of from 20 to 1,000;
bringing the first and second substrates together, thereby mixing and reacting the isocyanate component and the polyol component to form an adhesive composition between the first and second substrates, wherein the film thicknesses of the components control the stoichiometric ratio of components in the adhesive composition when the films are brought together for mixing and reacting, such that the stoichiometric ratio of the isocyanate component to the polyol component ranges from 1:1 to 3:1; and
curing the adhesive to bond the first and second substrates,
wherein the adhesive comprises a viscosity greater than 10,000 mPa·s (at 40° C.) within 10 minutes after bringing the first and second substrates together.

10. The method for forming a laminate of claim 9, wherein the amine-initiated polyol is the reaction product of a $C_1$-$C_6$ alkylene oxide and an amine.

11. The method for forming a laminate of claim 10, wherein the alkylene oxide is selected from the group consisting of ethylene oxide, propylene oxide, 1,2-butylene oxide, and combinations of two or more thereof.

12. The method for forming a laminate of claim 10, wherein the amine is selected from the group consisting of toluene diamine, methylamine, ethylenediamine, diethylenetriamine, aniline, aminoethylethanolamine, bis-3-aminopropylmethylamine, propylenediamine, tetra-hexamethyleneamine, triethanolamine, phenylenediamine, and combinations of two or more thereof.

13. The method for forming a laminate of claim 9, wherein the amine-initiated polyol accounts for 0.5 to 20 wt % of the adhesive composition, based on the total weight of the adhesive composition.

14. The method for forming a laminate of claim 9, the polyol component further comprising at least one non-amine-initiated polyol selected from the group consisting of a polyester polyol, a polyether polyol, a polycarbonate polyol, a polyacrylate polyol, a polycaprolactone polyol, a polyolefin polyol, a natural oil polyol, and combinations of two or more thereof.

15. The method for forming a laminate of claim 9, further comprising adding an additive to the adhesive composition, the additive selected from the group consisting of a tackifier, a plasticizer, a rheology modifier, an adhesion promoter, an antioxidant, a filler, a colorant, a surfactant, a catalyst, a solvent, and combinations of two or more thereof.

16. The method for forming a laminate of claim 9, wherein the first substrate and second substrate are each selected from the group consisting of wood, metal, plastics, composite materials, paper, fabric, and combinations of two or more thereof.

17. A laminate formed by the method of claim 9.

* * * * *